Patented Nov. 27, 1923.

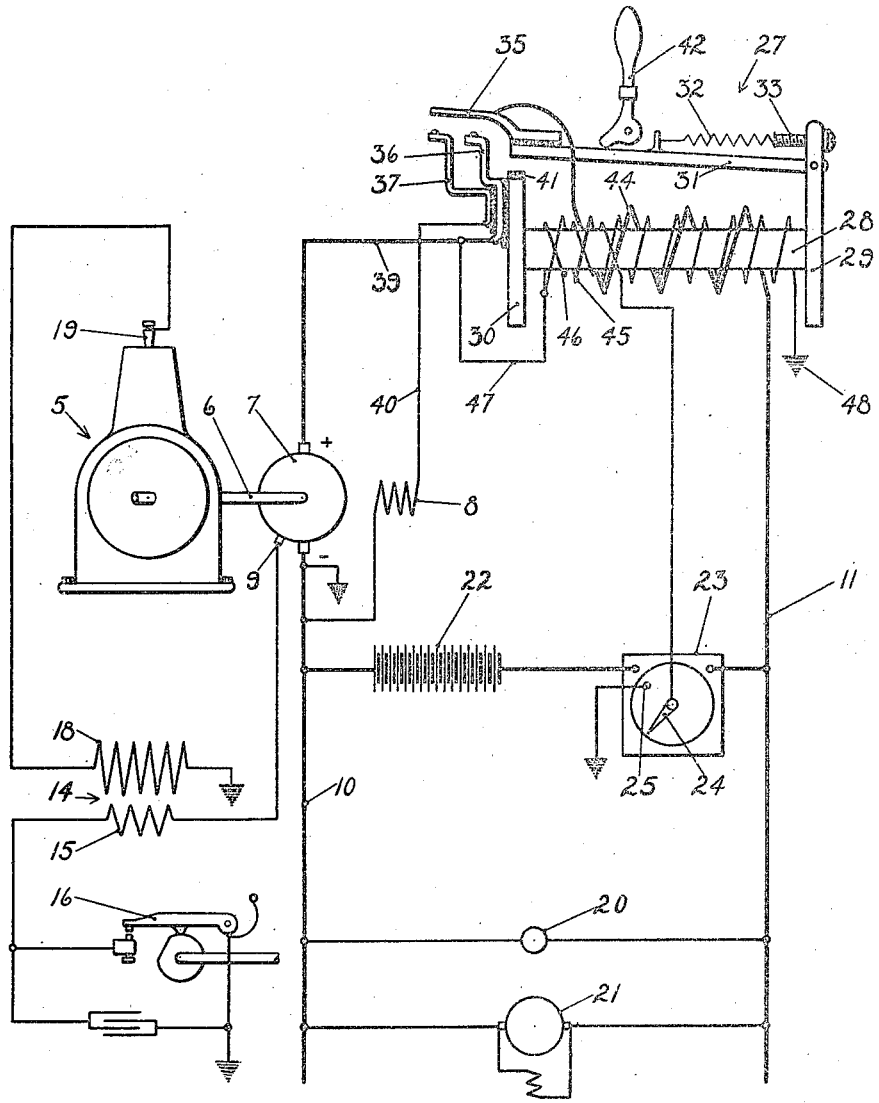

1,475,506

UNITED STATES PATENT OFFICE.

HARRY R. PATTERSON, OF TOLEDO, OHIO.

ELECTRIC POWER PLANT.

Application filed September 10, 1919, Serial No. 322,794. Renewed March 27, 1923.

*To all whom it may concern:*

Be it known that I, HARRY R. PATTERSON, a citizen of the United States, residing at Toledo, in the county of Lucas and State of Ohio, have invented certain new and useful Improvements in Electric Power Plants, of which I declare the following to be a full, clear, and exact description.

This invention relates to electric power plants which include an internal combustion engine as a prime mover and a dynamo electric machine driven thereby and furnishing current to charge a storage battery to supply translating devices such as electric lamps, motors, etc.

An object of my invention is to provide a simple, economical and efficient system of the nature indicated which will be positive and reliable in its operation and which does not require the attention of a skilled operator for its successful use.

Further objects of this invention relate to economies of manufacture and details of construction as will hereinafter appear from the detailed description to follow. I accomplish the objects of my invention in one instance by the devices and means described in the following specification, but it is evident that the same may be varied widely without departing from the scope of the invention as pointed out in the appended claims. A structure constituting one embodiment of my invention, which may be the preferred, is illustrated in the accompanying drawings forming a part thereof, in which:

The single figure of the drawing is a diagrammatic showing of my invention.

On the drawing, an internal combustion engine is shown at 5 directly connected by a shaft 6 to a dynamo electric machine 7 having a shunt field winding 8 and a third brush 9 and whose main brushes are connected to the main circuit wires 10 and 11. To the third brush 9 is connected the ignition system for the engine comprising an induction coil 14 having a primary 15 connected to a cam driven interrupter 16 and whose secondary 18 connects with the spark plug 19 of the engine.

Translating devices such as a lamp 20 and a motor 21 are shown connected across the main circuit wires 10 and 11 and also connected across these wires is a storage battery 22 in series with an ampere hour meter 23. This meter is adapted to operate in both directions to indicate both the number of ampere hours put into and taken from the battery. It is provided with a movable contact member 24, which, when the meter indicates full charge, is adapted to engage a grounded stationary contact 25.

Arranged in series with the wire 11 is an electromagnetic switch 27 having a core 28 between end heads 29 and 30. Pivoted to the end head 29 is an armature 31 normally held in a retracted position by a spring 32, whose tension may be adjusted by means of adjusting screw 33. At its opposite end the armature 31 carries a contact member 35 insulated from it and adapted to make contact with two stationary contacts 36 and 37. These two stationary contacts are mounted on the end head 30 but insulated therefrom and from each other, the contact 36 being connected with the dynamo electric machine 7 by wire 39 forming a part of main circuit wire 11, while the contact member 37 connects by means of wire 40 with the shunt field winding 8. A suitable piece 41 of non-magnetic material prevents the armature 31 from coming in direct contact with the end head 30. An operating handle 42 is provided for the purpose of depressing the armature 31 to bring the switches controlled thereby into closed circuit position. The core 28 is provided with three windings, a series or current winding 44 and two shunt or potential windings 45 and 46. One end of the series winding 44 connects with the contact member 35 carried by the armature while the other end connects with circuit wire 11. One end of each of the potential windings 45 and 46 connects with the wire 39 by means of a wire 47 and the opposite end of winding 45 is grounded at 48 while the opposite end of potential winding 46 connects with the movable contact 24 of the ampere hour meter. When the battery is being charged by the dynamo electric machine 7 acting as a generator, the potential winding 45 and the series winding 44 act cumulatively while the potential winding 46 being wound oppositely to the potential winding 45 acts differentially.

The operation of the device is as follows:—

Suppose, with the engine still and the switch and ampere hour meter in the position illustrated in the drawing, it is desired to charge the battery. The hand lever 42 would be rocked to depress armature 31 to close the shunt field circuit and the charging circuit of the dynamo electric machine. Current will thereupon flow from the battery through the ampere hour meter, the electro-magnetic switch, the shunt field winding and the armature of the dynamo electric machine whereby this machine will operate as a motor to turn over the engine. Suitable E. M. F. will also be supplied from the third brush 9 to the ignition system of the engine. The lever 42 will be held in the rocked position until the engine begins to operate under its own power and reaches normal speed. Current will now flow from the dynamo electric machine through the electromagnetic switch and the battery to charge it and the combined flux due to the current winding 44 and the potential winding 45 will now be sufficient to hold the armature 31 in closed circuit position. At the completion of the charge, the switch 24, will touch the grounded contact 25 thereby closing the circuit of the potential winding 46. Since the effect of this winding is opposite to that of the other two windings it will serve to decrease total flux in the core to such an extent that the armature 31 can no longer be held in its closed circuit position. Contact member 35 thereupon opens the shunt field circuit and the main charging circuit stopping the charge and causing the E. M. F. of the generator to fall to a value insufficient to provide for proper ignition. The engine, accordingly, soon comes to rest and the apparatus automatically resumes the condition with which the description of the operation was started.

As current is drawn from the battery by the translating devices the ampere hour meter operates in the opposite direction from what it did on charge and the contact member will accordingly move away from the grounded contact and remain out of contact therewith until the battery has again been given a full charge.

Having thus described my invention, what I claim as new and desire to secure by Letters Patent, is:

1. In a system of the class described, the combination of a dynamo-electric machine, a battery in circuit therewith and adapted to be charged thereby, an electro-magnetic switch biased to open circuit position for controlling said charging circuit having a potential winding for holding said switch closed during the charging of the battery, said switch having a current winding for opposing the effect of said potential winding upon discharge of the battery through the dynamo-electric machine, a second potential winding on said switch wound to oppose said first potential winding to permit the release of said switch and means responsive to the passage of a predetermined quantity of electricity into said battery for controlling the circuit of said second potential winding.

2. In a system of the class described, the combination of a dynamo-electric machine, a battery in circuit therewith and adapted to be charged thereby, an electro-magnetic switch biased to open circuit position for controlling said charging circuit having a potential winding for holding said switch closed during the charging of the battery, a current winding cumulative with said potential winding during charging of the battery, a second potential winding for opposing the combined effect of said series and first potential windings to permit the release of said switch and an ampere hour meter in said battery circuit for controlling the circuit of said second potential winding.

3. In a system of the class described, the combination of a dynamo-electric machine, a battery in circuit therewith and adapted to be charged thereby, an electro-magnetic switch biased to open circuit position for controlling said charging circuit having a potential winding for holding said switch closed during the charging of the battery, said switch having a current winding cumulative with said potential winding during the charging of the battery, and adapted to oppose the same upon discharge of the battery through said machine to permit the release of said switch, a second potential winding for opposing the combined effect of said series and first potential windings to also permit the release of said switch and an ampere hour meter in said battery circuit for controlling the circuit of said second potential winding.

4. In a system of the class described the combination of a dynamo electric machine, a battery in circuit therewith to be charged thereby, an electromagnetic switch in said charging circuit, said switch having a current winding, a first potential winding and a second potential winding wound oppositely to said first potential winding and means responsive to the passage of a predetermined quantity of electricity through said battery for controlling the energization of said second potential winding.

5. In a system of the class described the combination of a dynamo electric machine, a battery in circuit therewith and adapted to be charged thereby, an electromagnetic switch for controlling said charging circuit having a series or current winding, a first potential winding wound to act cumulatively with respect to said current winding when the battery is being charged and a second potential winding wound oppositely to said first potential winding and means responsive to the passage of a predetermined quantity of electricity through said battery for controlling the energization of said second potential winding.

6. In a system of the class described the combination of a dynamo electric machine, a battery in circuit therewith and adapted to be charged thereby, an electromagnetic switch for controlling said charging circuit having a current winding, a first potential winding wound to act cumulatively with respect to said current winding when the battery is being charged and a second potential winding wound oppositely to said first potential winding and an ampere hour meter in series with said battery for controlling the circuit of said second potential winding.

7. In a system of the class described the combination of an internal combustion engine having an ignition system, a dynamo electric machine having a shunt field winding and permanently connected to supply current to said ignition system, a storage battery connected to be charged by said dynamo electric machine, a circuit for translating devices connected to receive current either from said dynamo electric machine or from said battery, an electromagnetic switch in said charging circuit having a current winding, a potential winding wound to act cumulatively with said current winding when the battery is being charged, a second potential winding wound reversely to said first potential winding, an ampere hour meter in series with said battery having a switch for controlling the circuit of said second potential winding, said electromagnetic switch being constructed to control both its battery charging circuit and the shunt field circuit.

In testimony whereof, I affix my signature.

HARRY R. PATTERSON.